US006997327B2

(12) United States Patent
Sprenger

(10) Patent No.: US 6,997,327 B2
(45) Date of Patent: Feb. 14, 2006

(54) SALT-TOLERANT, WATER ABSORBING FILTER

(75) Inventor: Gregory S. Sprenger, Colorado Springs, CO (US)

(73) Assignee: Velcon Filters, Inc., Colorado Springs, CO (US)

( * ) Notice: Subject to any disclaimer, the term of this patent is extended or adjusted under 35 U.S.C. 154(b) by 0 days.

(21) Appl. No.: 10/948,029

(22) Filed: Sep. 23, 2004

(65) Prior Publication Data

US 2005/0061728 A1    Mar. 24, 2005

Related U.S. Application Data

(60) Provisional application No. 60/505,595, filed on Sep. 24, 2003.

(51) Int. Cl.
*B01D 29/00* (2006.01)
(52) U.S. Cl. .............. 210/489; 210/497.01; 210/502.1; 210/505
(58) Field of Classification Search ................ 210/266, 210/282, 284, 497.01, 502.1, 505, 489
See application file for complete search history.

(56) References Cited

U.S. PATENT DOCUMENTS

| | | | |
|---|---|---|---|
| 3,262,578 A | * | 7/1966 | Dennis .................... 210/489 |
| 4,048,075 A | * | 9/1977 | Colvin et al. .............. 210/484 |
| 4,787,949 A | * | 11/1988 | Cole et al. .................. 156/222 |
| 5,122,270 A | * | 6/1992 | Ruger et al. ................. 210/282 |
| 5,274,018 A | | 12/1993 | Tanaka et al. |
| 5,669,894 A | | 9/1997 | Goldman et al. |
| 6,380,456 B1 | | 4/2002 | Goldman |
| 6,603,055 B1 | | 8/2003 | Mitchell et al. |

FOREIGN PATENT DOCUMENTS

| WO | WO 96/15162 | 5/1996 |
|---|---|---|
| WO | WO 96/17681 | 6/1996 |

* cited by examiner

*Primary Examiner*—Ivars C. Cintins
(74) *Attorney, Agent, or Firm*—Fraser Martin Buchanan Miller LLC; Donald R. Fraser

(57) ABSTRACT

A filter comprises a paper layer, at least one outer particle filtering layer adjacent the paper layer, an ion exchange layer adjacent the at least one outer particle filtering layer, at least one outer non-woven layer adjacent the ion exchange layer, at least one salt-tolerant superabsorbant polymer layer adjacent the at least one outer non-woven layer, an inner particle filtering layer adjacent the at least one salt-tolerant superabsorbant polymer layer, an inner non-woven layer adjacent the inner particle filtering layer, and a support adjacent the inner non-woven layer.

Alternatively, the filter comprises a paper layer, at least one outer particle filtering layer adjacent the paper layer, at least one salt-tolerant superabsorbant polymer layer adjacent the at least one outer particle filtering layer, an inner particle filtering layer adjacent the at least one salt-tolerant superabsorbant polymer layer, an inner non-woven layer adjacent the inner particle filtering layer, and a support adjacent the inner non-woven layer.

5 Claims, 2 Drawing Sheets

SALT-TOLERANT, WATER ABSORBING FILTER

CROSS-REFERENCE TO RELATED APPLICATION

This application claims the benefit of U.S. Provisional Patent Application Ser. No. 60/505,595 filed Sep. 24, 2003.

FIELD OF THE INVENTION

This invention relates generally to a salt-tolerant, water absorbing filter. More particularly, the invention is directed to a multi-layered filter useful for de-watering and filtering hydrocarbon streams containing salt contaminants.

BACKGROUND OF THE INVENTION

Filters containing superabsorbent polymers (SAP) have been used in the aviation fueling industry for many years. A major functional requirement is that the filter media absorb undissolved water and remove it from the fuel steam. These types of filters have provided very reliable and robust performance, improving flight safety.

The evaluation of used filters has uncovered performance problems. The SAP present in such filters has been found to have degraded in use, resulting in poorer water absorption. Thus, the removal of water from the transient fuel stream has been compromised.

It has been recognized for years that SAP water absorption is degraded by many water-soluble contaminant compounds. These compounds include alcohols, ethers, other polar organic molecules, and most importantly, inorganic salts. These salt compounds are considered to be rare in normal aviation fuel handling. Based on analysis of used SAP and fuel samples themselves, however, it has been determined that the presence of inorganic salts is much more common than previously thought.

The degradation of SAP in aviation fuel service is now known to be caused by the absorption of inorganic salts into the SAP. This reduces that absorption of water and the subsequent swelling of these polymers.

It is an object of the invention to produce a filter to negate or counteract the deleterious effects of inorganic salts.

Another object of the invention is to produce a filter having the capability of removing inorganic salts from aviation fuels.

Still another object of the invention is to produce a filter which incorporates salt-tolerant SAP materials.

An alternative object of the invention is to produce a filter having the capability of removing salt from the transient fluid by ion exchange.

SUMMARY OF THE INVENTION

Accordant with the present invention, an improved filter has surprisingly been discovered. The inventive filter comprises a paper layer, at least one outer particle filtering layer adjacent the paper layer, an ion exchange layer adjacent the at least one outer particle filtering layer, at least one outer non-woven layer adjacent the ion exchange layer, at least one salt-tolerant superabsorbant polymer layer adjacent the at least one outer non-woven layer, an inner particle filtering layer adjacent the at least one salt-tolerant superabsorbant polymer layer, an inner non-woven layer adjacent the inner particle filtering layer, and a support adjacent the inner non-woven layer.

The filter of the present invention is particularly useful for filtering and separating the water and other dissolved and suspended contaminants from a flowing stream of an organic liquid; such as for de-watering and filtering aviation or motor fuel, dielectric fluids, and the like.

BRIEF DESCRIPTION OF THE DRAWINGS

The above objects and advantages of the invention may be more clearly understood by considering the following descriptions when read in the light of the accompanying drawings, in which.

DETAILED DESCRIPTION OF THE PREFERRED EMBODIMENT

Figure 1:
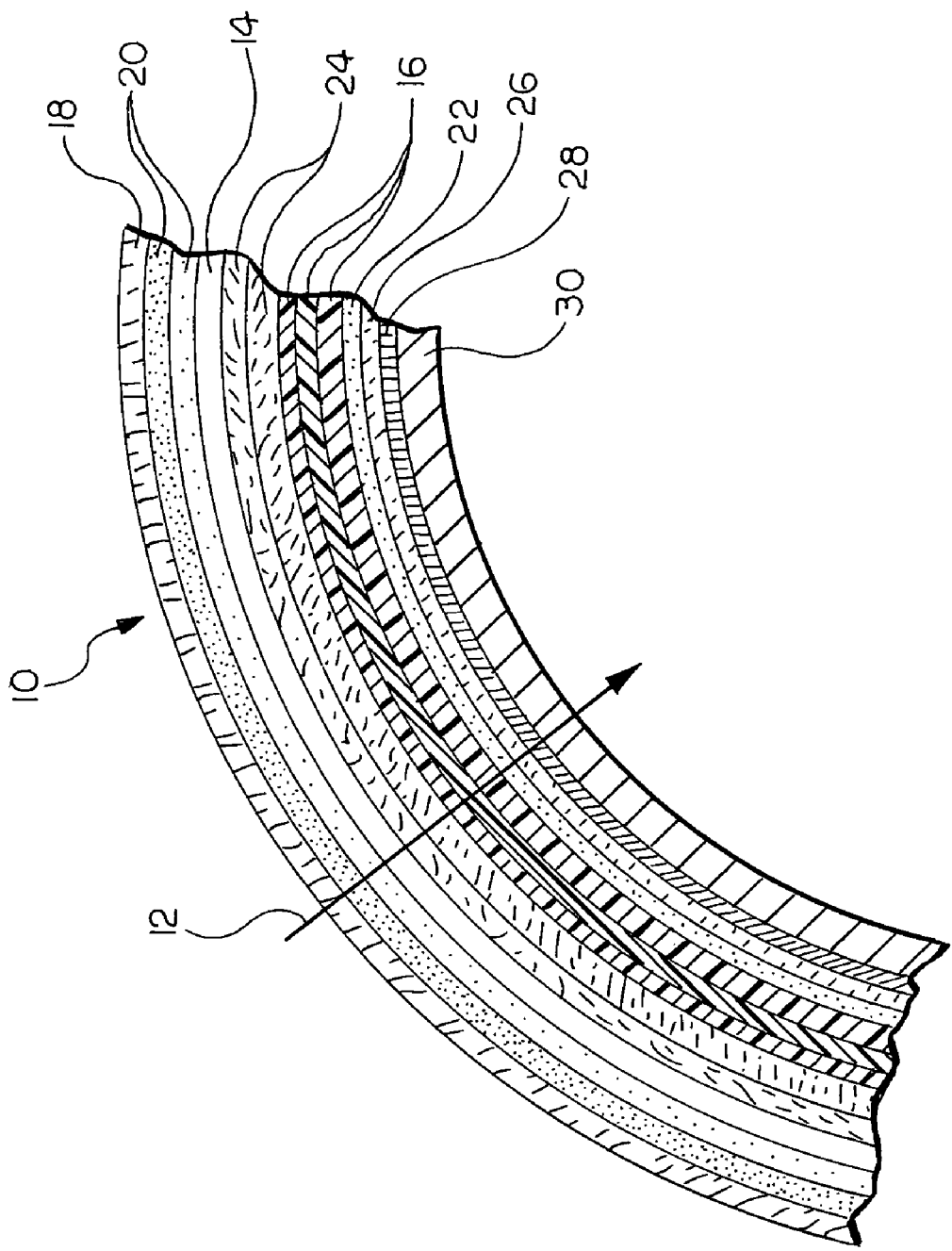
FIG. 1 is a fragmentary sectional view of a filter for removing water from transient hydrocarbon fluids, such as jet fuels, including an ion exchange hydrogel forming polymer having cationic and/or anionic ion exchange capabilities.

Referring to FIG. 1 of the drawings, there is illustrated at 10 a filter for removing water from transient hydrocarbon fluids, such as jet fuel, wherein the fluid to be treated flows in the direction of the arrow 12 from the outside to the inside of a hollow cylindrical cartridge. One of the layers 14 of the fluid treating material includes an ion exchange media capable of absorbing inorganic salts from the transient fluids.

Ion exchange resins are available in a variety of forms, which can exchange H+ for cationic ions and OH– for anionic ions. The resulting H+ and OH– form water, which would be absorbed by the SAP. A mixed bed of ion exchange resins, in a variety of forms, could be imbedded into a filter layer matrix. Granules of ion exchange resin could be added to a fibrous matrix. Alternatively, fibrous ion exchange media could be used. Ion exchange resins and support filter matrix media are well-known in the art, and need not be further discussed.

One or more of the layers 16 of fluid treating material according to the present invention, is formed of a superabsorbent polymer having salt tolerant characteristics. FIG. 1 illustrates three such layers.

Much research has been done over the last 10 years to improve SAP absorption of human urine, which is approximately equal to 0.9% NaCl in water. SAP molecules may contain both anionic and cationic sites. These SAP materials are targeted to combat the phenomena known as "salt poisoning" in the baby diaper industry. Currently, few of these types of polymers are available in large quantities; however, special applications such as aviation fuel filtration may provide sufficient volumes for mass production.

Recent SAP research has been directed to salt-tolerant materials. However, a new approach is to use un-neutralized SAP material, containing both acid and basic functional sites. Currently "neutralized" SAP contains primarily cations of sodium or potassium instead of the acidic H+ ions, with the organic hydrogel portion anionic in nature. Alternatively, basic functional groups would contain OH– anions. As salt water is absorbed, the H+ and OH– groups released from the active sites combine to form water. This provides increased salt tolerance, because there are no cations or anions present in the original SAP material. Salt-tolerant SAP materials, including un-neutralized SAP materials, are well-known in the art, and are typically available in granular or powder form.

The filter 10 according to the present invention additionally comprises layers of perforated paper, particle filtering media, non-woven media, and is formed on a structural support.

The outer perforated paper layer 18 may be formed from any paper material known to be useful for the preparation of filter devices. The paper from which the paper layer 18 may be prepared includes, by way of example but not limitation, natural or synthetic pulp paper, kraft paper, paperboard, cardboard, and the like, as well as laminates thereof.

The filter 10 according to the present invention additionally comprises at least one outer particle filtering layer 20 and an inner particle filtering layer 22. FIG. 1 illustrates an embodiment of the inventive filter comprising two outer particle filter layers 20. The inner and outer particle filter layers 22 and 20 may comprise any monolithic porous material including, but not necessarily limited to, a non-woven or woven textile cloth or mat, a sponge material, paper, or the like. A preferred particle filter 20 and 22 would generally comprise bonded fibrous or filamentous materials having a web or carded fiber structure, or a mat in which the fibers are distributed either in a random fashion or in a substantially aligned manner. The fibers or filaments from which non-woven, woven, or monolithic particle filter layers 20 and 22 may be prepared generally comprise natural materials, e.g., fibers or filaments of wood, silk, jute, hemp, cotton, linen, and the like, or synthetic materials, e.g., polyolefin, polyester, rayon, cellulose ester, polyvinyl, polyamide, and the like, as well as combinations of all of the above.

The thicknesses and porosities of the inner and outer particle filtering layers 22 and 20 may vary over wide limits, and will be evident to those ordinarily skilled in the art depending upon the sizes of the suspended particles that must be removed from the fluid stream passing therethrough. Obviously, the inner particle filtering layer 22 must be able to remove smaller particles than the outer particle filtering layer 20. The inner and outer particle filtering layers 22 and 20 may be the same, or may be different from one another.

The filter 10 according to the present invention furthermore comprises at least one outer non-woven layer 24 and an inner non-woven layer 26. FIG. 1 illustrates an embodiment of the invention including two outer non-woven layers 24. The inner and outer non-woven layers 26 and 24 may comprise non-woven webs of polymer fibers. Suitable polymer fibers include, but are not necessarily limited to, polyester, polycarbonate, acrylic, rayon, nylon, polyamide, and polyolefin fibers, as well as blends, copolymers, and combination thereof. The inner and outer non-woven layers 26 and 24 may be the same, or may be different from one another.

The filter 10 may be supported by a perforated, substantially rigid, cylindrical support structure such as for example a support screen 28 and center tube 30. The support screen 28 and center tube 30 are constructed so as to support the various layers of the filter 10, and provide resistance against the fluid flowing through the filter 10 in the direction of the arrow 12 in FIG. 1. The support screen 28 and center tube 30 include apertures (not shown) to allow fluid flow from the exterior to the interior of the filter.

According to the present invention, the support screen 28 and center tube may individually be prepared from any relatively rigid, inert material. Suitable materials include, but are not necessarily limited to: plastics, such as for example polyester, nylon, polycarbonate, polyurethane, rayon, polyamide, polyolefin, and the like, as well as blends and copolymers thereof; reinforced plastic composites comprising phenolic resin, polycarbonate resin, polyester resin, polyamide resin, nylon resin, acetal resin, urethane resin, methacrylate resin, urea-formaldehyde resin, and the like, as well as blends and copolymers thereof, said resins containing glass, ceramic, carbon, metal, natural fibers, or synthetic polymer fibers, or mixtures thereof; and metals, such as for example, stainless steel, nickel, chromium, titanium, and the like, as well as alloys thereof.

The thicknesses of the support screen 28 and center tube 30 may vary over wide limits, and may readily be determined by one ordinarily skilled in the art as meeting the requirements for supporting the layers of the filter 10 and resisting the pressure caused by the flow of fluid through the filter 10. The support screen 28 and center tube 30 may be the same, or may be different from one another.

Figure 2:
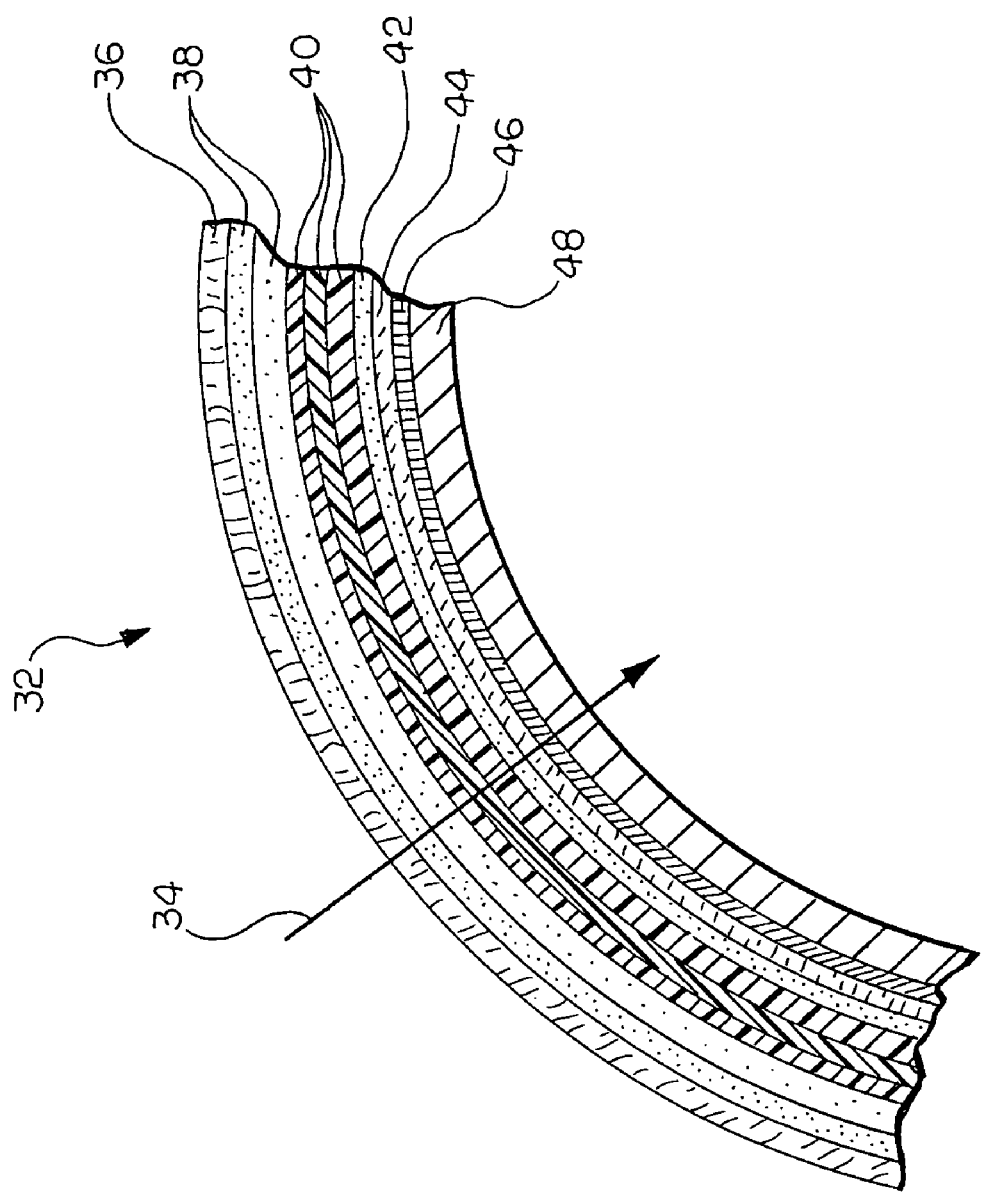
FIG. 2 is a fragmentary sectional view of another embodiment of the invention illustrating a filter including a quantity of a salt-tolerant hydrogel forming superabsorbent polymer.

FIG. 2 illustrates an alternative embodiment of the inventive filter at 32. The fluid to be dewatered and filtered flows from the exterior to the interior of the filter 32 in the direction of the illustrated arrow 34. The filter 32 includes an outer paper layer 36, at least one outer particle filtering layer 38 (two outer particle filter layers are illustrated in FIG. 2), at least one SAP layer 40 (three SAP layers are illustrated in FIG. 2), an inner particle filter layer 42, and an inner non-woven layer 44. The filtering layers of the filter 32 are mounted on a cylindrical support comprising a screen 46 and a tube 48. These various layers and the cylindrical support illustrated in FIG. 2 may be prepared from the same materials as the corresponding layers and support illustrated in FIG. 1.

The filter of the present invention may be assembled using conventional means, by applying consecutive layers of the filtering materials onto a pre-formed cylindrical support, to prepare the assemblage illustrated in FIG. 1 or FIG. 2. Alternatively, cylindrical units of the layer materials may be prepared, each having a slightly larger diameter in order to accommodate the layer immediately inwardly adjacent thereto, and the assemblage prepared by nesting the consecutive layers to form the filter illustrated in FIG. 1 or FIG. 2.

The filters disclosed hereinabove have been described in terms of their broadest application to the practice of the present invention. Occasionally, however, the materials or parameters described may not be precisely applicable to each filter variant included within the claimed scope. Those instances where this occurs will be readily recognized by those ordinarily skilled in the art. In all such cases, the inventive device may be prepared by routine modifications, e.g., other porous support structures may be used, or other adjuvants may be added to the filter layers to give additional performance or mechanical properties to the device, or other methods of constructions and assembly of the filter may be employed, etc., or modifications which are otherwise conventional may be made.

The invention is more easily comprehended by reference to the specific embodiments recited hereinabove which are representative of the invention. It must be understood, however, that the specific embodiments are provided only for the purpose of illustration, and that the invention may be practiced otherwise than as specifically illustrated without departing from its spirit and scope.

What is claimed is:

1. A filter comprising:
   a paper layer;
   at least one outer particle filtering layer adjacent the paper layer;
   an ion exchange layer adjacent the at least one outer particle filtering layer;
   at least one outer non-woven layer adjacent the ion exchange layer;
   at least one salt-tolerant superabsorbent polymer layer adjacent the at least one outer non-woven layer;
   an inner particle filtering layer adjacent the at least one salt-tolerant superabsorbent polymer layer;
   an inner non-woven layer adjacent the inner particle filtering layer; and
   a support adjacent the inner non-woven layer.

2. The filter according to claim 1, wherein the paper layer comprises natural pulp paper, synthetic pulp paper, Kraft paper, paperboard, cardboard, or a laminate thereof.

3. The filter according to claim 1, wherein the inner and outer particle filtering layers each, individually comprise a woven textile mat, a non-woven textile mat, a sponge material, or a paper material, comprising fibers or filaments or wood, silk, jute, hemp, cotton, linen, polyolefin, polyester, rayon, cellulose ester, polyvinyl, polyamide, or a combination thereof.

4. The filter according to claim 1, wherein the inner and outer non-woven layers each, individually comprise fibers of polyester, polycarbonate, acrylic, rayon, nylon, polyamide, polyolefin, or a blend, copolymer, or combination thereof.

5. The filter according to claim 1, wherein the support comprises plastic, a reinforced plastic composite, or metal.

* * * * *